Oct. 10, 1939.  S. J. ZAND  2,175,584
VARIABLE RATIO MANUAL CONTROLLER FOR AIRCRAFT
Original Filed May 21, 1935
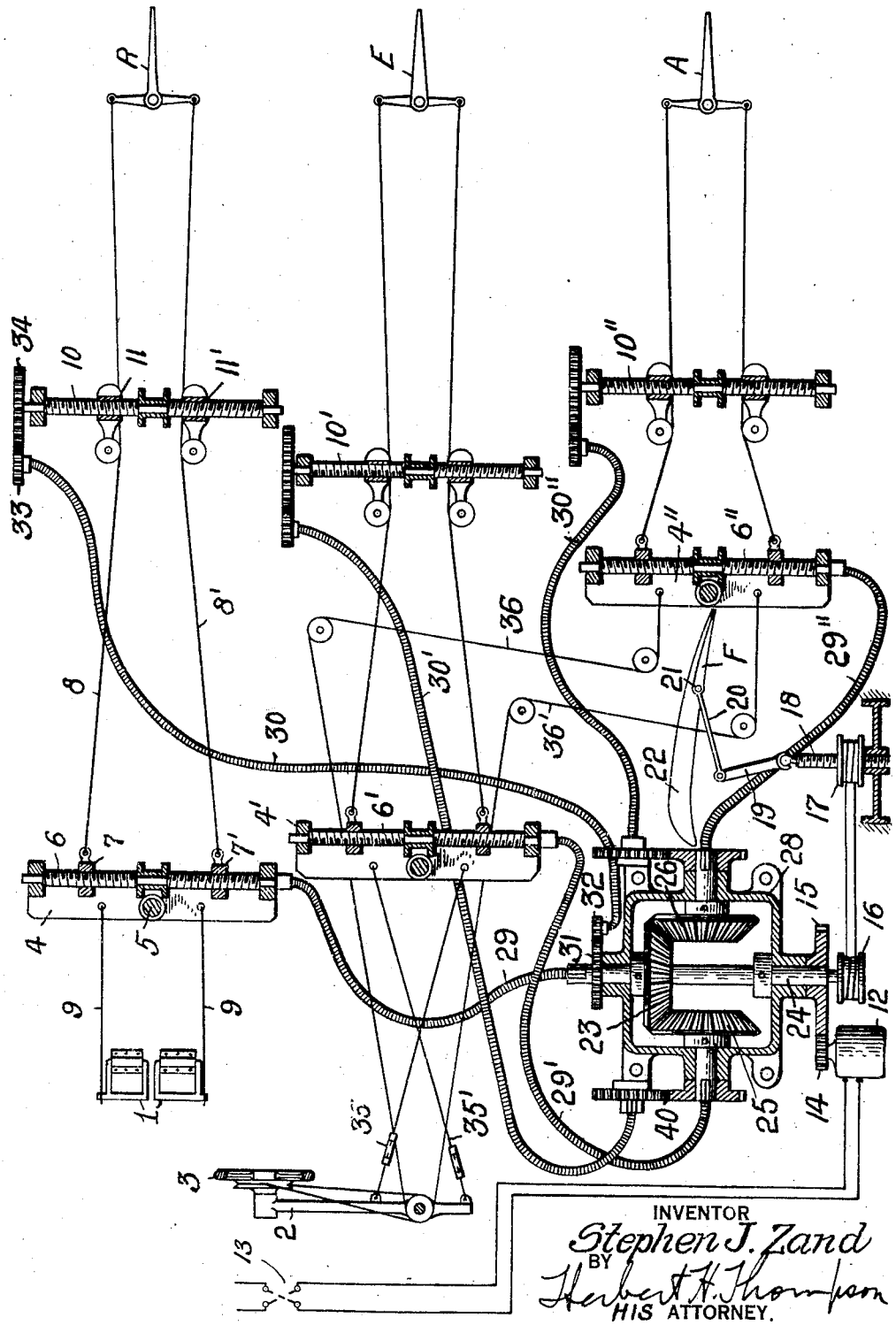
INVENTOR
Stephen J. Zand
BY
Herbert H. Thompson
HIS ATTORNEY.

Patented Oct. 10, 1939

2,175,584

UNITED STATES PATENT OFFICE 2,175,584

VARIABLE RATIO MANUAL CONTROLLER FOR AIRCRAFT

Stephen J. Zand, Forest Hills, N. Y., assignor to Sperry Gyroscope Company, Inc., Brooklyn, N. Y., a corporation of New York Application May 21, 1935, Serial No. 22,554
Renewed September 25, 1937

8 Claims. (Cl. 244—83)

This invention relates to the control of aircraft, especially of high speed craft in which auxiliary devices are usually provided for reduced speeds, as when landing. The amount of angular displacement of an airplane control stick or wheel is, roughly, inversely proportional to the speed of the airplane. Where, as in modern planes, the ratio between the landing speed and top speed is great, the control of the airplane under the two conditions named becomes difficult, since if the control is built to have sufficient movement at low speeds, it becomes over-sensitive at high speeds, and if built to operate normally at high speed, it will not control the airplane efficiently at slow or landing speeds. The dual speed range is usually obtained by the use of flaps, usually located at the rear and under the wing surface so as to increase the camber of the air foil, thus increasing both the drag and lift to greatly lower the speed of the craft and at the same time maintain it in the air.

According to my invention, I provide an automatic means which changes the ratio of movement between the control sticks and the several control surfaces or rudders of the plane (i. e., the elevating, steering and aileron rudders, or at least some of the same) in accordance with the position of the flap, so that when the flap is not in use, a minimum movement of the control surfaces is secured, while when the flap or spoiler is down, a maximum movement is secured for a given movement of the control stick. In other words, I decrease the relative movement of the control surfaces as the craft passes from its low speed range to its high speed range, and vice versa.

Referring to the drawing, the single figure is a diagram showing how my invention may be applied to the three controls of an airplane, in elevation, laterally and in azimuth. The steering rudder is shown at R and is normally controlled from a foot pedal 1; the elevator is at E and is controlled by forward and backward movement of the control stick 2; and the ailerons, represented at A, are controlled by the rotation of wheel 3 on stick 2, these controls being intended to represent any conventional manual control system for airplanes. Between each manually operated part and its control surface, I place a variable throw device 4, 4', 4", by which the ratio of movement of the rudder to the movement of the control device is/varied. This may take the form of a block pivoted on a shaft 5 for oscillation, and having rotatably mounted thereon a threaded shaft 6 which is shown as having threads at the opposite ends thereof of opposite pitch. On each end is threaded a nut 7, 7' to which control cables 8 and 8' are secured, which are connected to the rudder R.

Block 4 is shown as oscillated from the foot pedals 1 by cables 9 and 9'. In order to take up the slack in the cables 8, 8' and maintain the same under constant tension, I provide a second reversely threaded shaft 10 on which are mounted, at each end, nuts 11 and 11'. By rotating shafts 6 and 10 in opposite directions, the nuts 11 and 11' will move in the opposite direction from the nuts 7 and 7' to maintain constant tension of the cables.

Both of shafts 6 and 10 are preferably rotated automatically from the means for adjusting the flap F which controls the effective camber of the air foil. In this case the flap is shown as power actuated from an electric motor 12, the operation of which is controlled by a switch 13 on the aircraft panel. The motor 12 is shown as operating through a pinion 14 and gear 15, a drum 16 which turns a similar drum 17 provided with internal threads and operating to screw up and down threaded shaft 18. The raising and lowering of said shaft controls the position of flap F through any suitable means, such as the link 19 and lever 20 which turns the flap about pivot 21, usually placed underneath and near the rear of the main air foil or wing, represented diagrammatically at 22. The flap controlling means actuates both shafts 6 and 10 through any suitable gearing. As shown, a bevel gear 23 is mounted on shaft 24 of pinion 15 and turns a pair of bevel gears 25 and 26. Shaft 24 also extends through the gear box 28 and is coupled to a flexible shaft 29 connected with the shaft 6. The shaft 10 is likewise turned through flexible shaft 30 driven from a gear 31 on shaft 24 and a pinion 32, the shaft 30 driving the shaft 10 through pinion 33 and gear 34 on shaft 10.

The controls for the ailerons and elevator are similar and are also actuated from the same gear box 28. As shown, the elevator control 2 is connected to the oscillatory member 4' through cross cables 35 and 35', and the threaded shaft 6' of member 4' is turned through a flexible shaft 29' driven from the bevel gear 25, while the threaded shaft 10' is driven through suitable gearing 40 and flexible shaft 30' from the same bevel gear. Similarly, bevel gear 26 drives a threaded shaft 6" of oscillatory member 4", which is connected by cables 36 and 36' to be actuated from the turning of handle 3. In this case, flexible shafts 29" and 30" connect the shafts 6" and 10", respectively, through bevel gear 26.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. The combination with an aircraft having an auxiliary wing device for reducing landing speed, the ordinary control surfaces and the manual controls therefor, of means between at least some of said controls and the said surfaces for varying their relative ratios of movement, and means connecting said auxiliary wing device and said ratio varying means for causing increased throw of said surfaces when landing.

2. In an aircraft control system having control surfaces and manual controls therefor, an auxiliary device for increasing the effective camber of the air foil for reduced landing speed, and means for increasing the throw of said surfaces for a given movement of said manual controls brought into action by operation of said auxiliary device to increase the effective camber of the air foil.

3. The combination with an aircraft having an auxiliary wing device for reducing landing speed, the ordinary control surfaces and the manual controls therefor, of means between at least some of said controls and the said surfaces for varying their relative ratios of movement, means connecting said auxiliary wing device and said means for causing increased throw of said surfaces when landing, and means for maintaining the connections between said controls and said surfaces taut at all times.

4. In an aircraft control system having control surfaces and manual controls therefor, an auxiliary device for varying the effective camber of the air foil for correspondingly varying the minimum flying speed, and means for varying the throw of said surfaces for a given movement of said manual controls in accordance with the extent of movement of said auxiliary device, whereby, as the camber of the air foil is increased, the throw of said surface is increased.

5. The combination with an aircraft having a flap for reducing landing speed, the ordinary control surfaces and controls therefor, of means between at least one of said controls and its control surface for varying their relative ratio of movement, and means for connecting said flap and said ratio varying means for causing increased throw of said control surface when said flap is moved to reduce landing speed.

6. The combination with an aircraft having a flap for varying the aircraft's wing camber to vary the craft's landing speed, the ordinary control surfaces and controls therefor, of variable transmission means between at least one of said controls and its control surface for varying their relative ratio of movement, and additional transmission means for connecting said flap and said variable transmission means for causing a progressive increase in the relative throw of said control surface with respect to its control as said flap is moved to reduce landing speed.

7. The combination with an aircraft having means for greatly varying flying speed and wing lift of the craft, the ordinary control surfaces and the controls therefor, of means between at least some of said controls and the said surfaces for varying their relative ratios of movement, and means connecting said first named means and said ratio varying means for causing increased throw of said surfaces at slow speeds.

8. The combination with an aircraft having wing flaps for varying the craft's normal speed and wing lift, the ordinary control surfaces and controls therefor, of variable transmission means between at least one of said controls and its control surface for varying their relative ratio of movement, and additional transmission means for connecting said wing flaps and said variable transmission means for causing a progressive increase in the relative throw of said control surface with respect to its control as said wing flaps reduce the craft's speed.

STEPHEN J. ZAND.